(12) United States Patent
Quintin

(10) Patent No.: US 11,327,796 B2
(45) Date of Patent: May 10, 2022

(54) METHOD FOR DEPLOYING A TASK IN A SUPERCOMPUTER BY SEARCHING SWITCHES FOR INTERCONNECTING NODES

(71) Applicant: BULL SAS, Les Clayes-sous-Bois (FR)

(72) Inventor: Jean-Noël Quintin, Bourg-la-Reine (FR)

(73) Assignee: BULL SAS, Les Clayes-sous-Bois (FR)

( * ) Notice: Subject to any disclaimer, the term of this patent is extended or adjusted under 35 U.S.C. 154(b) by 61 days.

(21) Appl. No.: 16/722,546

(22) Filed: Dec. 20, 2019

(65) Prior Publication Data
US 2020/0348972 A1 Nov. 5, 2020

(30) Foreign Application Priority Data

Dec. 21, 2018 (FR) .................................... 1873793
May 3, 2019 (FR) .................................... 1904669

(51) Int. Cl.
*G06F 9/48* (2006.01)
*G06F 9/50* (2006.01)
*H04L 49/10* (2022.01)

(52) U.S. Cl.
CPC .......... *G06F 9/4893* (2013.01); *G06F 9/5066* (2013.01); *G06F 9/5072* (2013.01); *H04L 49/10* (2013.01)

(58) Field of Classification Search
CPC ........................ H04L 41/0896; H04L 49/602
See application file for complete search history.

(56) References Cited

U.S. PATENT DOCUMENTS

| | | | |
|---|---|---|---|
| 7,757,033 B1 * | 7/2010 | Mehrotra | H04L 49/602 |
| | | | 710/316 |
| 8,155,022 B1 | 4/2012 | Ainsworth et al. | |
| 9,485,197 B2 * | 11/2016 | Dutta | H04L 41/0896 |
| 2014/0254388 A1 | 9/2014 | Kumar et al. | |

FOREIGN PATENT DOCUMENTS

| | | |
|---|---|---|
| EP | 2 988 215 A1 | 2/2016 |
| WO | WO 2017/056238 A1 | 4/2017 |

OTHER PUBLICATIONS

Search Report as issued in French Patent Application No. 1904669, dated Nov. 12, 2019.
Domke, J., et al., "Scheduling-aware routing for supercomputers," Nov. 2016, XP058308655, pp. 1-12.
Quintin, et al., "Transitively Deadlock-Free Routing Algorithms," ResearchGate, Mar. 2016, Retrieved from the Internet: URL: www.researchgate.net/publication/301345528_Transitively_DeadlockFree_Routing_Algorithms, 10 pages.

* cited by examiner

*Primary Examiner* — Eric C Wai
(74) *Attorney, Agent, or Firm* — Arc IP Law, PC; Joseph J. Mayo

(57) ABSTRACT

A method for deploying a task includes deploying the task in the supercomputer; executing the task; at the end of the execution of the task, detecting at least one link which is not allocated to any task, and setting each detected link in an inactive state, wherein the link requires a power consumption less than the power consumption required by a link associated with at least one task.

7 Claims, 14 Drawing Sheets

[Fig. 1]
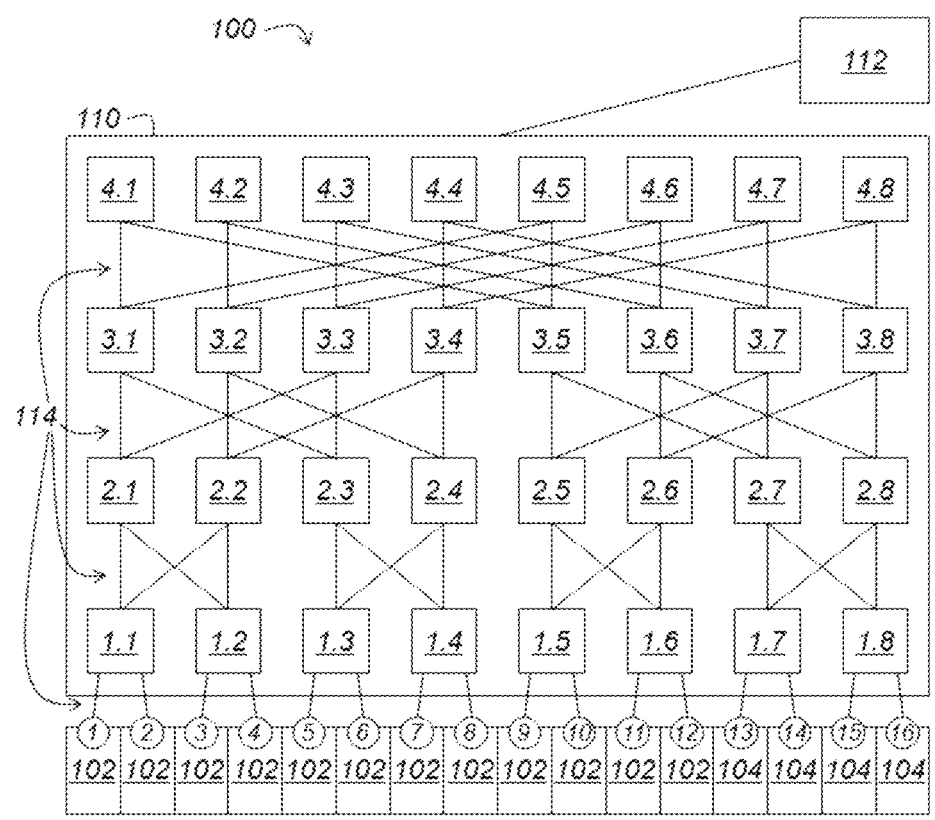

[Fig. 2]
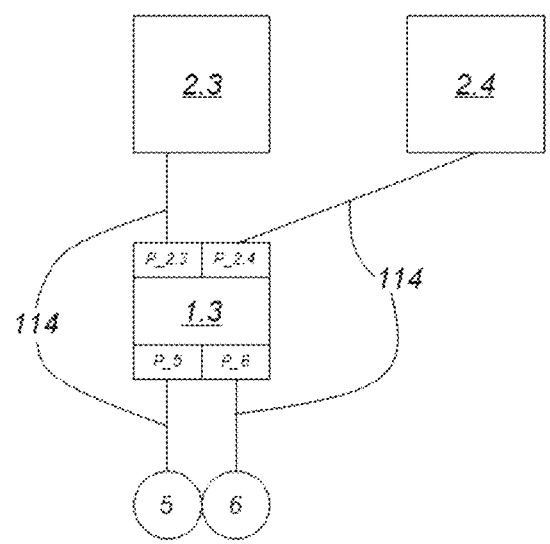

[Fig. 3]
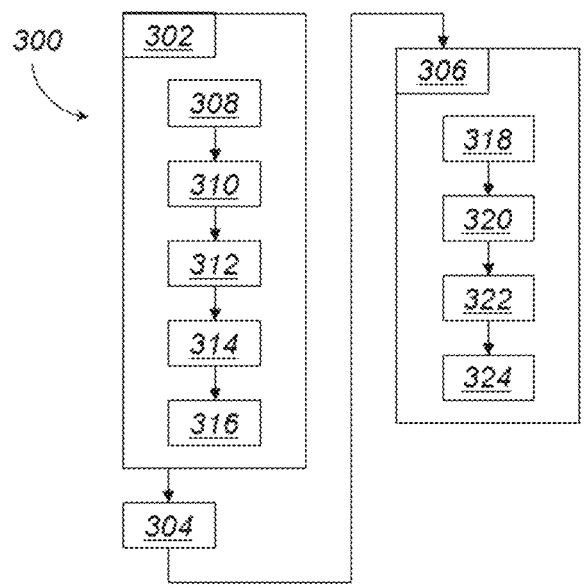

[Fig. 4]
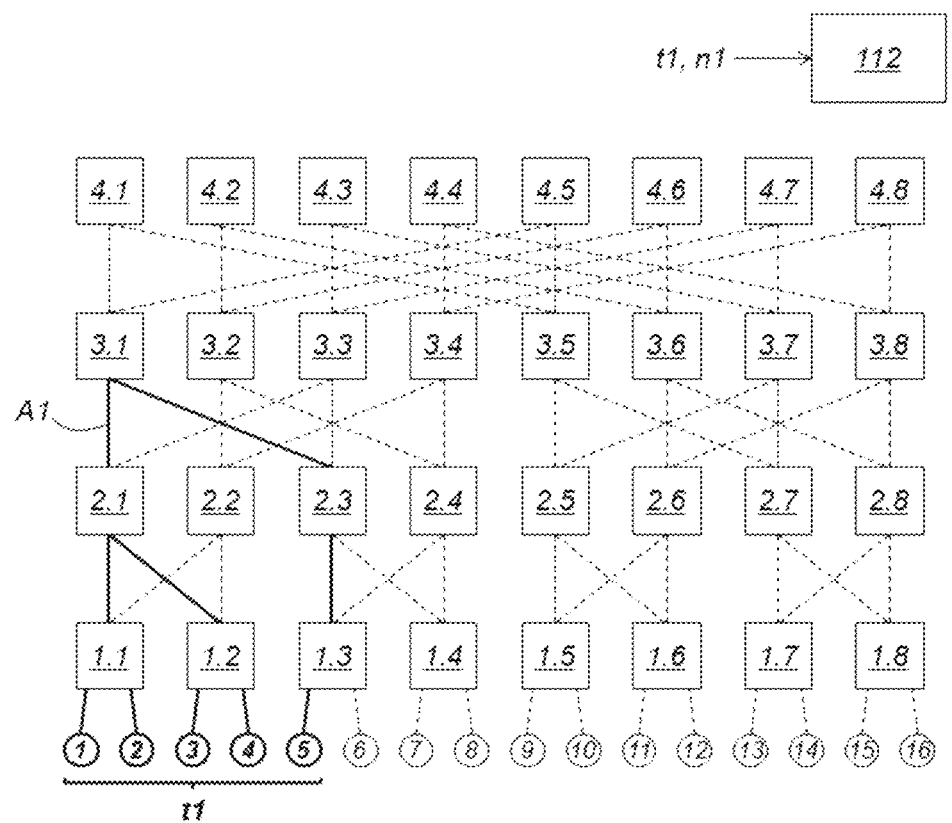

[Fig. 5]
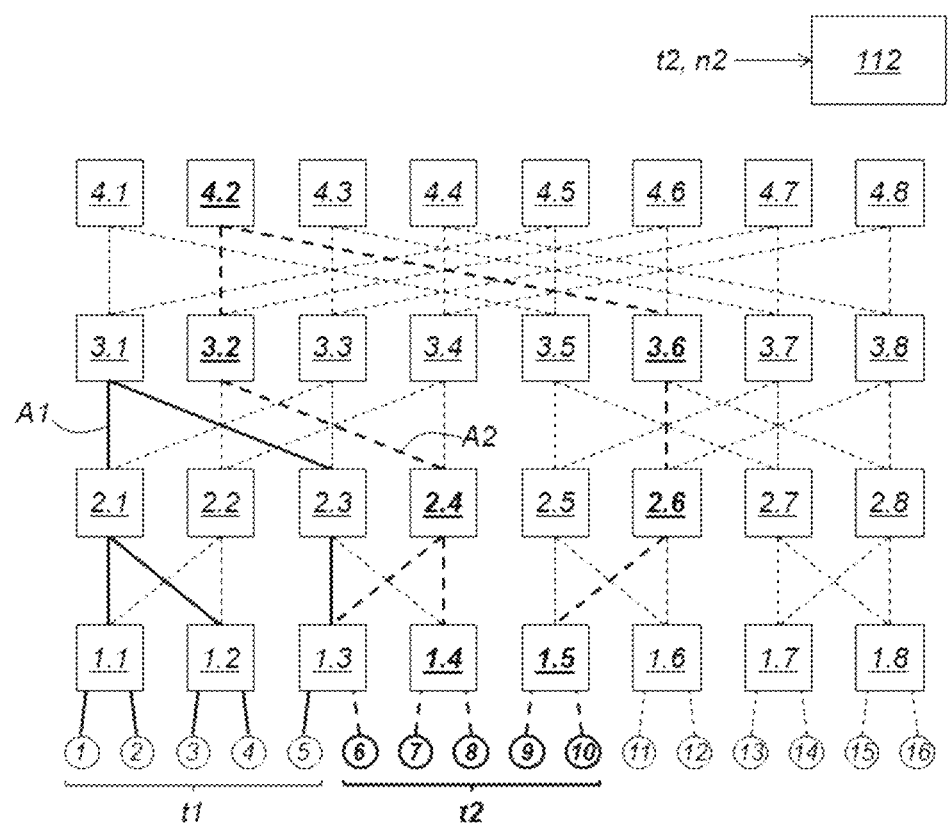

[Fig. 6]
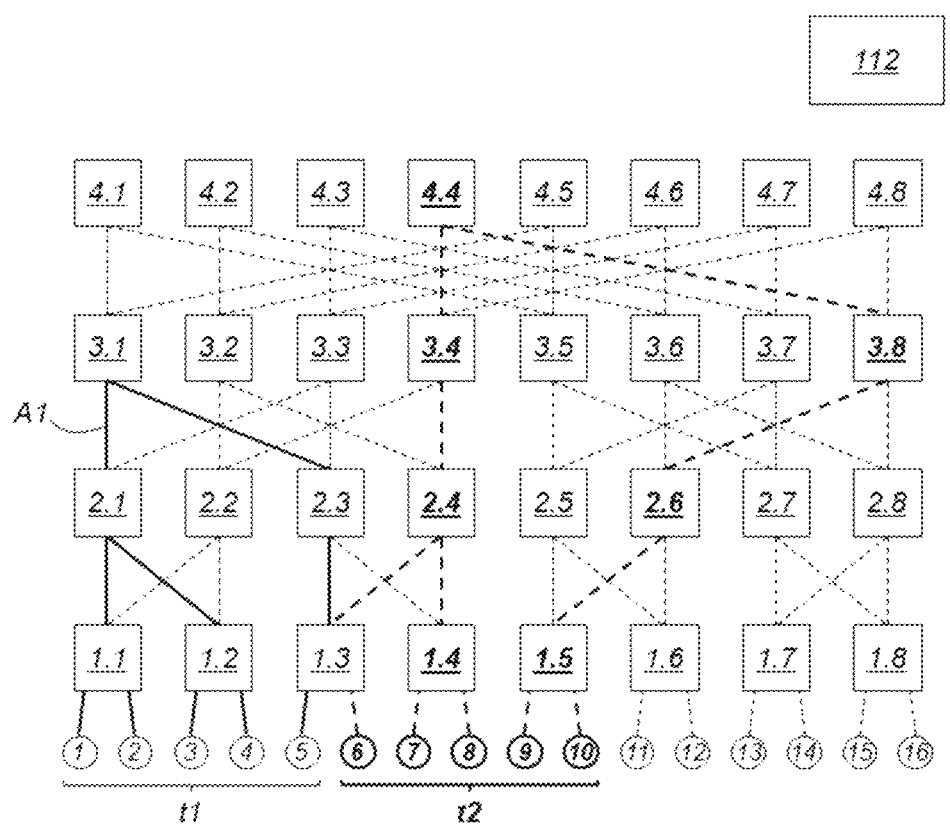

[Fig. 7]
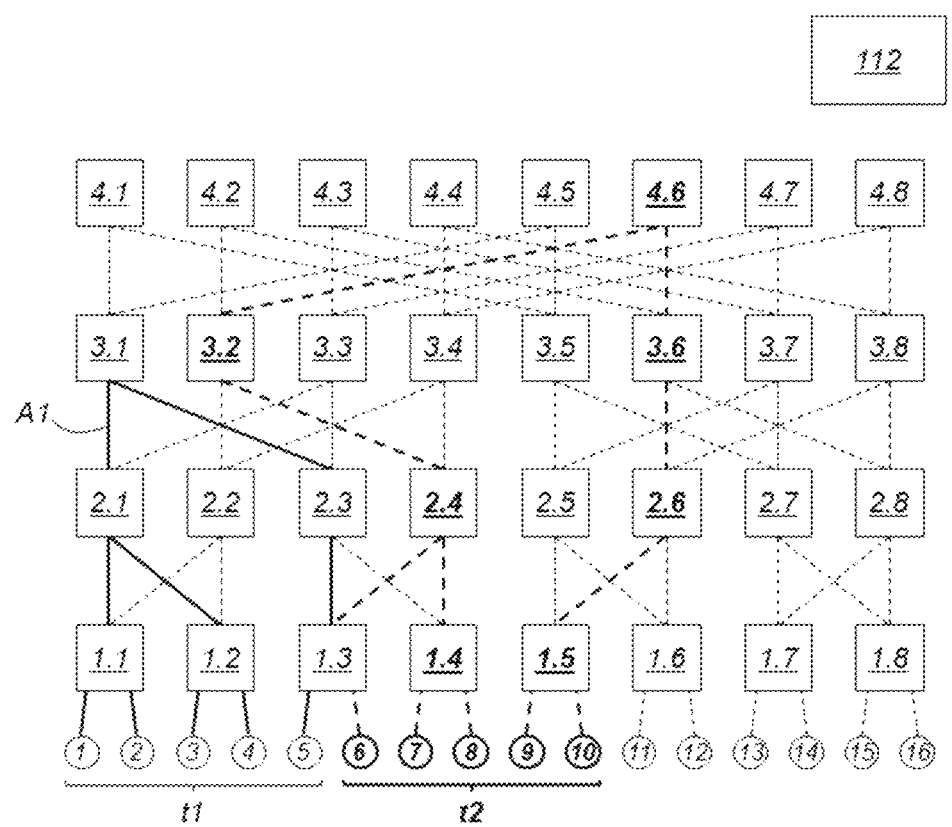

[Fig. 8]
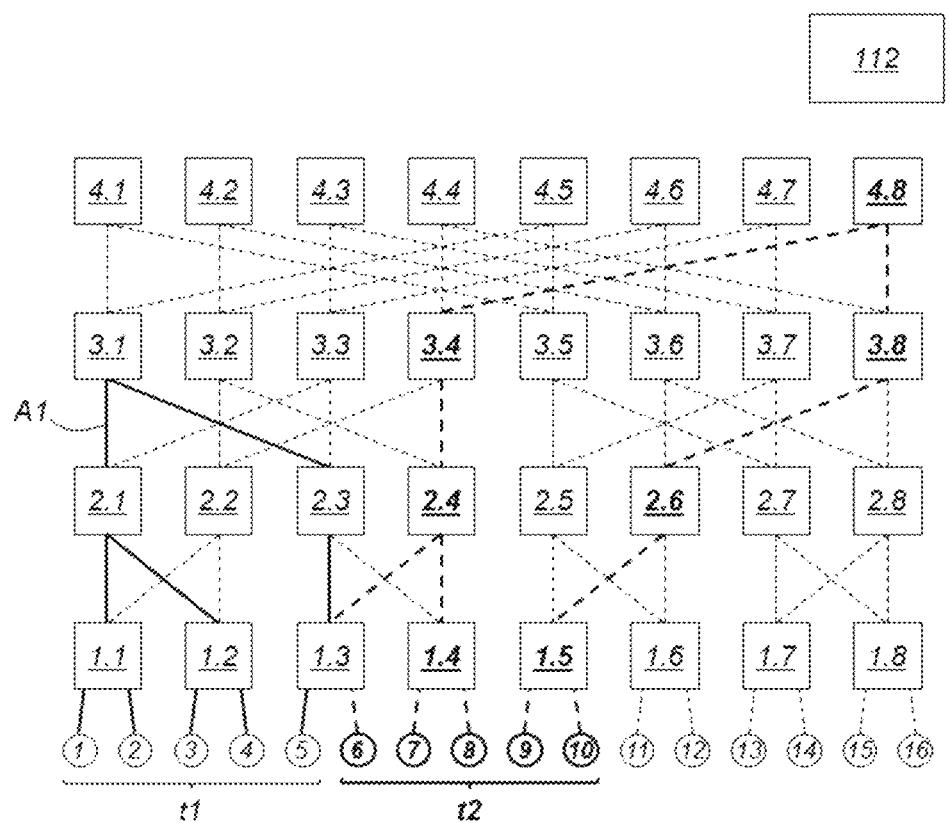

[Fig. 9]
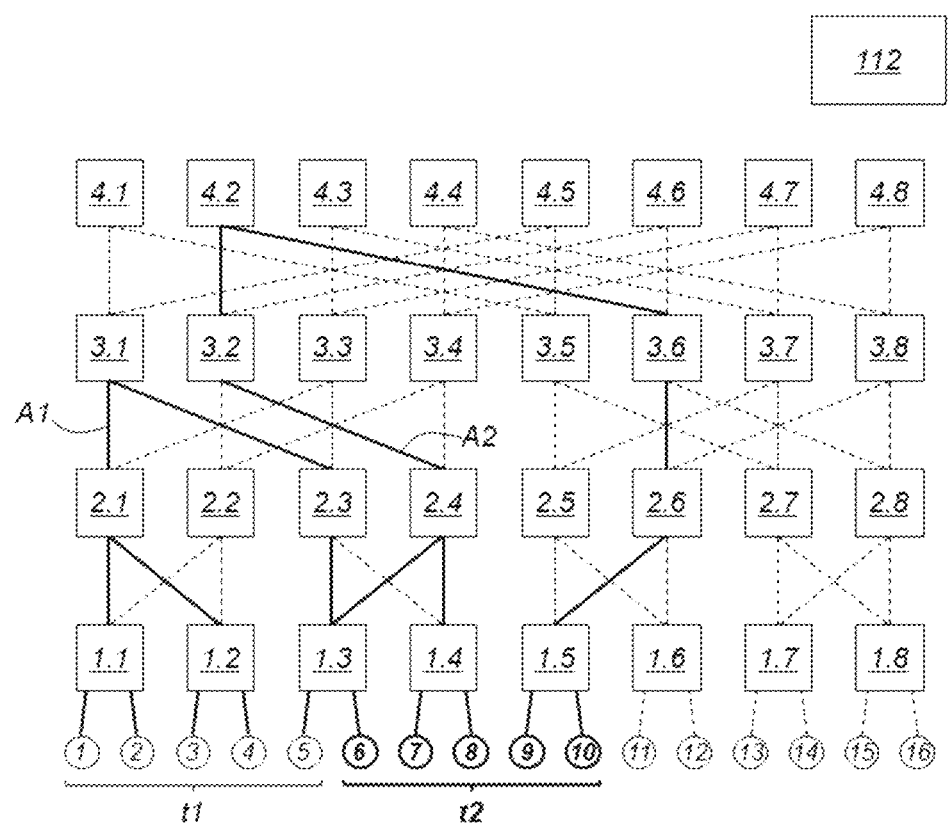

[Fig. 10]
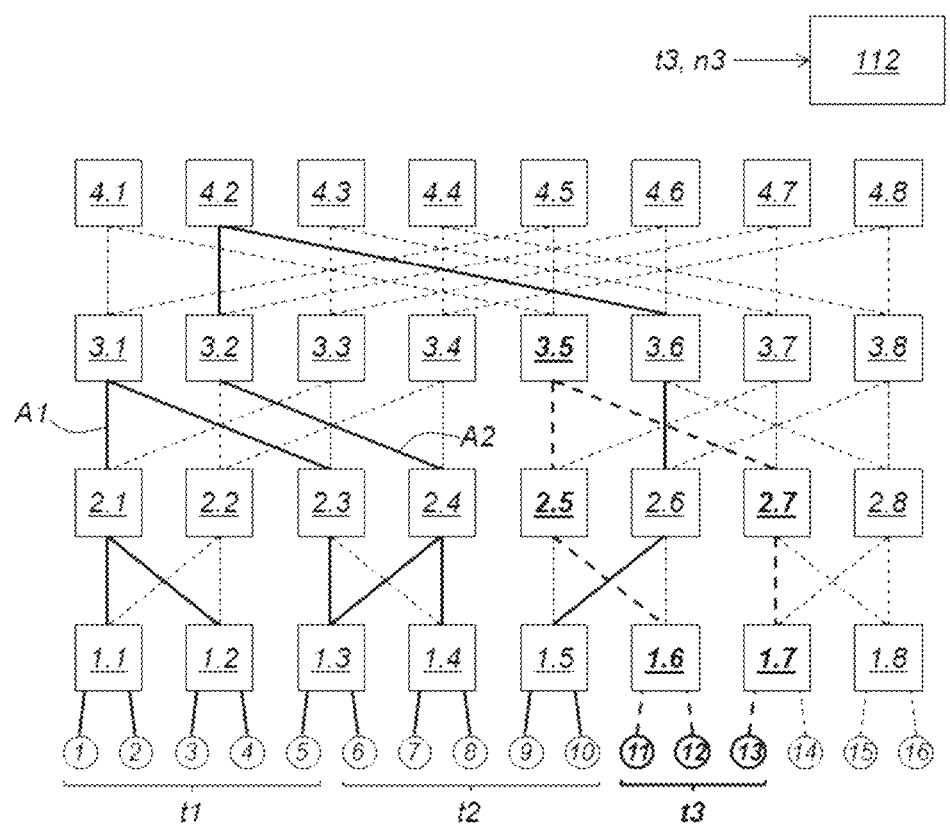

[Fig. 11]
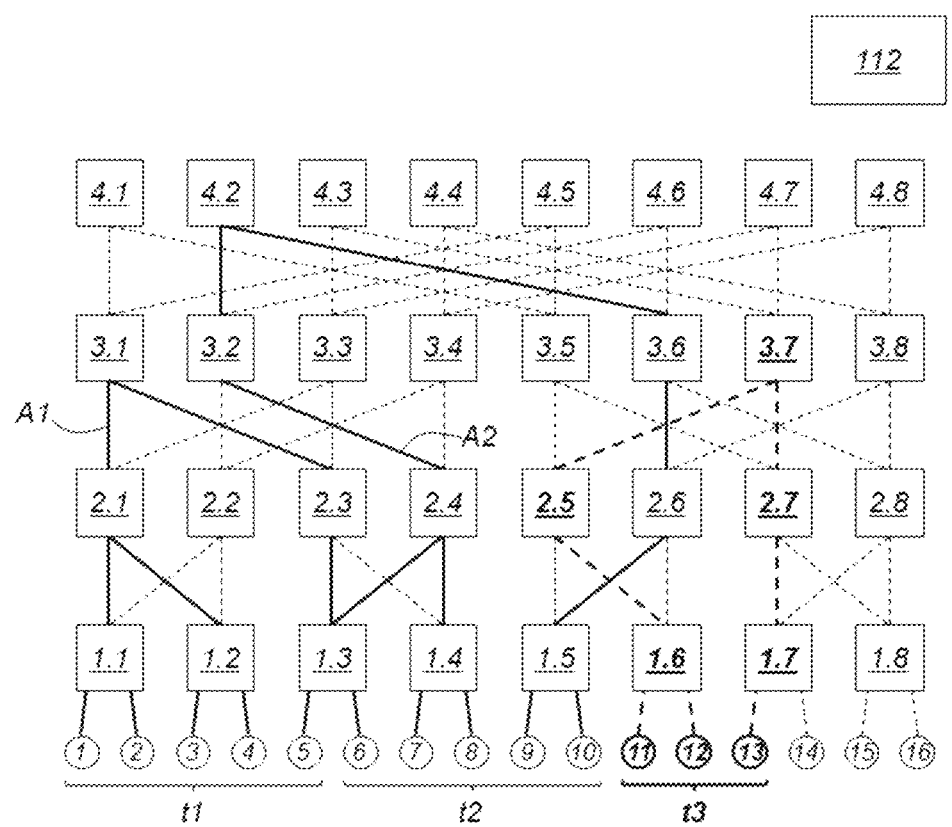

[Fig. 12]
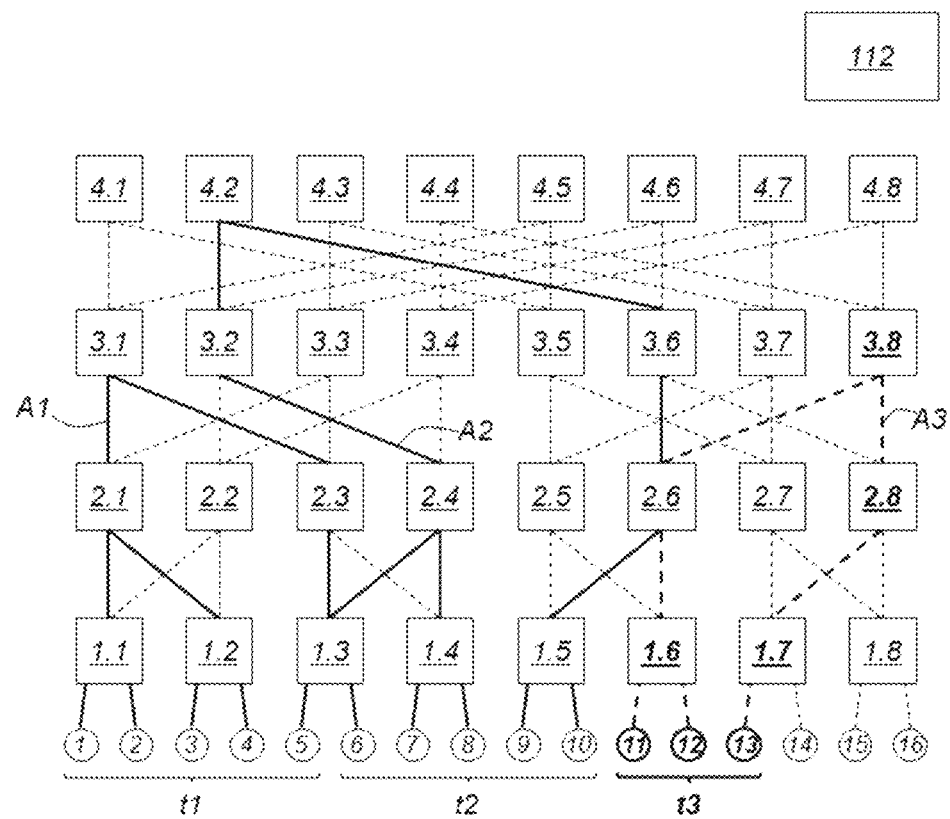

[Fig. 13]
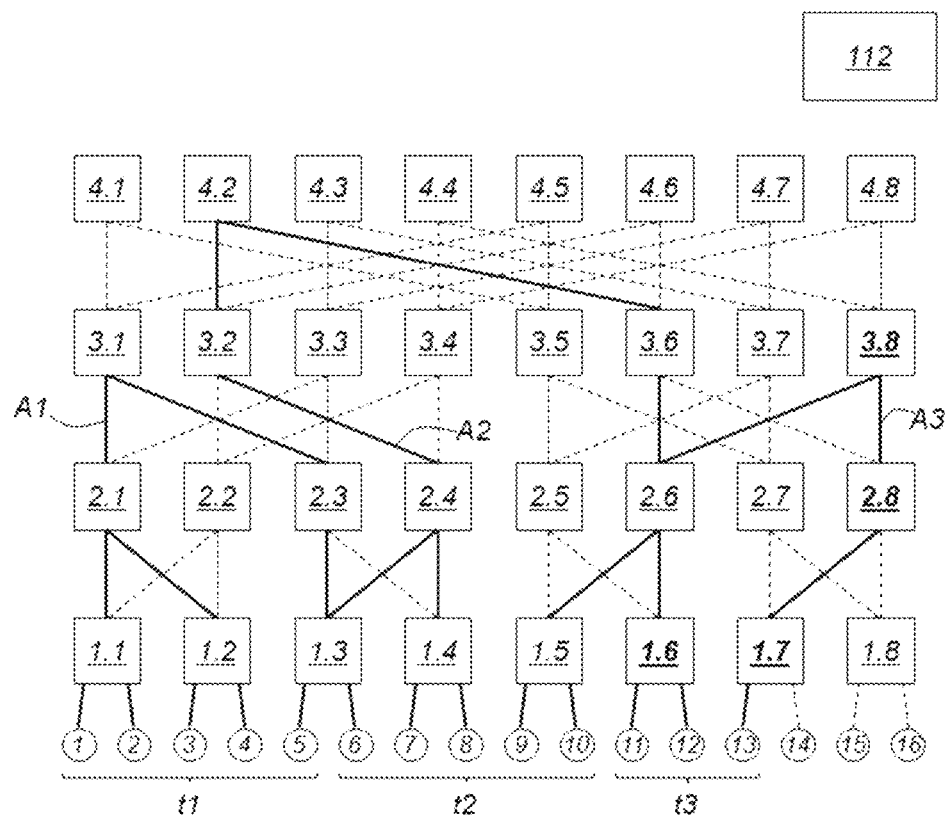

[Fig. 14]
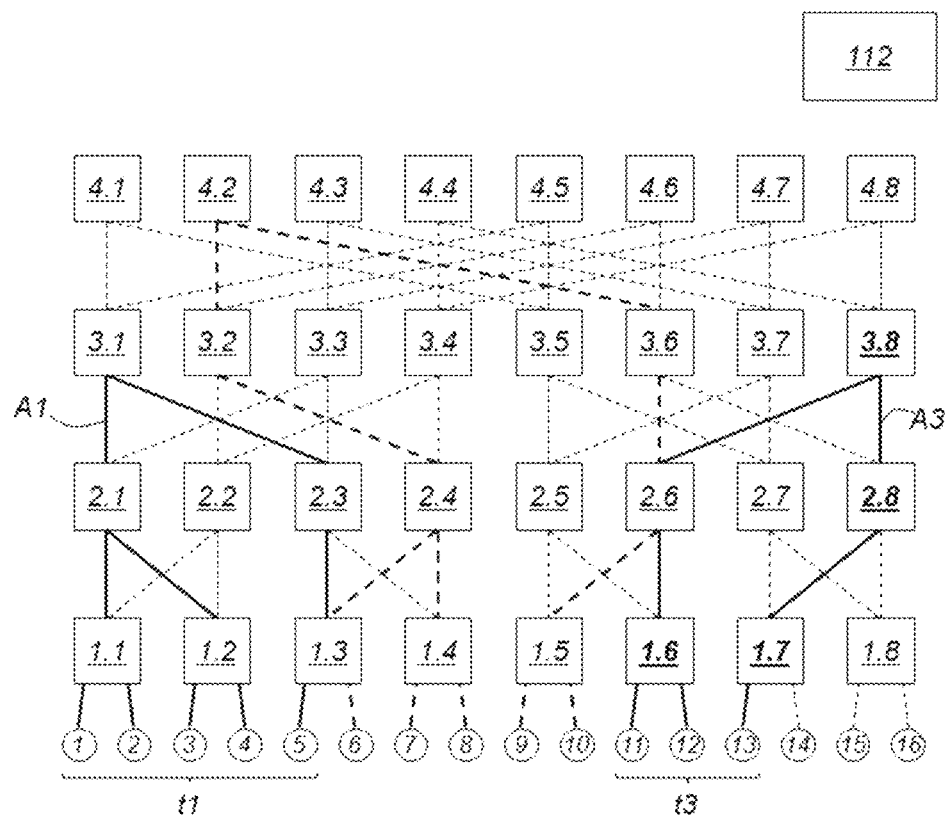

METHOD FOR DEPLOYING A TASK IN A SUPERCOMPUTER BY SEARCHING SWITCHES FOR INTERCONNECTING NODES

CROSS-REFERENCE TO RELATED APPLICATIONS

This application claims the benefit of French Patent Application No. 1873793 filed Dec. 21, 2018, and French Patent Application No. 1904669 filed May 3, 2019, the disclosures of which are herein incorporated by reference in its entirety.

This invention relates to a method for implementing a task in a supercomputer, an associated computer program and a supercomputer.

The invention applies more particularly to a method for implementing a task in a computer cluster forming a supercomputer comprising:
  computers, each having at least one network interface forming a node; and
  a node interconnection network, comprising:
    switches, each having network interfaces, and
    links, each connecting either a node and a network interface of one switch or to two network interfaces of two respective switches;
  the method comprising:
  deploying the task in the supercomputer, this deployment comprising:
    allocating nodes to the task,
    determining, in the network, a subnetwork, of interconnection of the allocated nodes, meeting one or more pre-defined determination criteria,
    allocating the subnetwork, and in particular the links belonging to this subnetwork, to the task; and
    implementing inter-node communication routes in the allocated subnetwork; and
  executing the task.

The article by J. Domke and T. Hoefler entitled Scheduling-Aware Routing for Supercomputers published in the Supercomputing Conference in 2016 (SC '16): Proceedings of the International Conference for High Performance Computing, Networking, Storage and Analysis, Salt Lake City, Utah, 2016, pp. 142-153, doi: 10.1109/SC.2016.12 describes a method using a database with the list of tasks running on the supercomputer, with routing recalculating routes according to their usage in order to reduce congestion on the network.

The article by Matthieu Perotin and Tom Cornebize entitled Isolating Jobs for Security on High-Performance Fabrics published in High-Performance Interconnection Networks in the Exascale and Big-Data Era (HiPINEB) 2017, IEEE 3rd International Workshop on, pp. 49-56, 2017, describes a method wherein tasks are isolated from each other (in the sense that they cannot communicate between each other) by deleting rows in routing tables, so that there is no route between two nodes allocated to two different tasks respectively.

Additionally, it is known to measure the speed in each link of a supercomputer and, when the measured speed is zero, to set this link into an inactive state.

Thus, it may be desirable to provide a method for deploying a task in a computer cluster forming a supercomputer, which allows reducing the energy consumption of the supercomputer.

The invention, thus, has the purpose of providing a method for deploying a task in a computer cluster forming a supercomputer, comprising:
  computers, each having at least one network interface forming a node; and
  a node interconnection network, comprising:
    switches, each having network interfaces, and
    links, each connecting either a node and a network interface of one switch or to two network interfaces of two respective switches;
  the method comprising:
  deploying the task in the supercomputer, this deployment comprising:
    allocating nodes to the task,
    determining, in the network, a subnetwork, of interconnection of allocated nodes, meeting one or more pre-defined determination criteria,
    allocating the subnetwork, and in particular the links belonging to this subnetwork, to the task, and
    implementing inter-node communication routes in the allocated subnetwork; and
  executing the task.
  the method being characterized in that it further comprises:
  at the end of the execution of the task:
    detecting at least one link that is not allocated to any task, and
    setting each detected link in an idle state, wherein the link requires less energy consumption than a link associated with at least one task.

Thus, the supercomputer's power consumption can be reduced, without the need to perform flow measurements in the links to deactivate those whose flow is zero.

Optionally, the method involves, in order to set a link in the inactive state, switching off the two network interfaces that this link connects so that no current or light flows through this link.

Optionally, the method also comprises, to set a link in an inactive state, decreasing an operating frequency of at least one of the two network interfaces that this link connects.

Also optionally, the subnetwork determination criterion or criteria comprise a criterion wherein the subnetwork uses only links which are not allocated to any other already deployed task or which are allocated to fewer than N other already deployed tasks, N being a predefined number equal to one or more.

Thus, the number of tasks sharing each link is limited, so that each link is unlikely to be congested. Thus, each task has the impression that it is the only one (or almost the only one) using the interconnection network. Thus, especially when a task is executed several times, the execution environment varies little, since it is little affected by the other running tasks.

Also optionally the predefined number N is set to one.

Also optionally the criterion or criteria for determining the subnetwork comprise a criterion for minimizing the number of switches used according to which the subnetwork determined is the one, among at least two subnetworks, satisfying the criteria other than the criterion for minimizing the number of switches in use, using the most switches already allocated, each to at least one already deployed task.

Thus, fewer switches are used, allowing to switch off, or set in a standby state, a large number of unused switches. Despite the over-consumption and slight latency due to the switching on or awakening of a switch, it was found that, on average, the method of the invention could allow saving energy without significantly delaying the deployment of tasks.

Also optionally the determination of the subnetwork involves determining the at least two subnetworks satisfying the criterion or criteria other than the criterion for the minimization of switches used, and then selecting from among at least these two subnetworks the one using the most switches each already allocated to at least one already deployed task.

It is also proposed a computer program downloadable from a communication network and/or saved to a medium that is readable by a computer and/or executable by a processor, characterized in that it comprises instructions for executing the steps of a method according to the invention, when said program is executed on one or more computers.

It is further proposed a computer cluster forming a supercomputer comprising:
  computers, each having at least one network interface forming a node;
  a node interconnection network, comprising:
    switches, each having network interfaces, and
    links, each connecting either a node and a network interface of one switch or two network interfaces of two respective switches;
  the supercomputer further comprising software and/or hardware means for deploying a task, designed to implement the following steps:
    deploying the task in the supercomputer, this deployment comprising:
      allocating nodes to the task,
      determining, in the network, a subnetwork, of interconnection of allocated nodes, meeting one or more pre-defined determination criteria,
      allocating the subnetwork, and in particular the links belonging to this subnetwork, to the task, and
      implementing inter-node communication routes in the allocated subnetwork; and
    executing the task;
    at the end of the execution of the task:
      detecting at least one link that is not allocated to any task, and
      setting each detected link in an idle state, wherein the link requires less energy consumption than a link associated with at least one task.

The invention will be better understood using the description which follows, given only by way of example, and prepared using the annexed drawings in which:

FIG. 1 schematically represents the general structure of a computer cluster forming a supercomputer, according to an embodiment of the invention, FIG. 2 shows a schematic representation of a switch of the supercomputer of FIG. 1, as well as the environment of this switch, FIG. 3 shows the successive steps of a method for implementing a task in the supercomputer of FIG. 1, according to an embodiment of the invention, FIG. 4 shows a node interconnection subnetwork of the supercomputer of FIG. 1 allocated to a first task, FIG. 5 shows a potential node interconnection subnetwork of the supercomputer of FIG. 1 allocated to a second task, FIG. 6 shows a potential node interconnection subnetwork of the supercomputer of FIG. 1 allocated to a second task, FIG. 7 shows a potential node interconnection subnetwork of the supercomputer of FIG. 1 allocated to a second task, FIG. 8 shows a potential node interconnection subnetwork of the supercomputer of FIG. 1 allocated to a second task, FIG. 9 shows the two node interconnection subnetworks of the supercomputer of FIG. 1 allocated to the first and second tasks respectively, FIG. 10 shows a potential node interconnection subnetwork of the supercomputer of FIG. 1 allocated to a third task, FIG. 11 shows a potential node interconnection subnetwork of the supercomputer of FIG. 1 allocated to a third task, FIG. 12 shows a potential node interconnection subnetwork of FIG. 1 allocated to a third task, FIG. 13 shows the three node interconnection subnetwork of the supercomputer of FIG. 1 allocated to the first, second and third tasks, respectively, and FIG. 14 shows links released after the second task was stopped, in the supercomputer of FIG. 1.

Referring to FIG. 1, a computer cluster 100 forming a supercomputer implementing this invention, will now be described.

The computer cluster 100 consists of independent computers 102, 104 which appear from the outside as a single computer with very high computing power, known as a High Performance Computing (HPC) computer or supercomputer. Each computer 102, 104 comprises, as known per se, a central processing unit, a main memory wherein instructions for the central processing unit are to be stored and at least one network interface.

The network interfaces each form nodes 1 16 of the computer cluster 100. Several network interfaces (and thus, several nodes 1 16) may belong to a single computer 102, 104, or, as in the example described, each computer 102, 104 may have only one network interface forming one of nodes 1 16.

Also in the example described, computers 102, 104 in the computer cluster 100 comprise computing computers 102 and storage computers 104, the latter having mass storage devices such as hard disks for recording data used and/or produced by the computing computers 102.

Also in the example described, the network interfaces of the storage computers 104 are optical network interfaces, while the network interfaces of the computing computers 102 are electrical network interfaces having a lower throughput than the optical network interfaces. This is because storage computers 104 typically exchange more data than computing computers 102.

Additionally, the computer cluster 100 includes a network 110 of interconnected nodes 1 16.

The network 110 comprises, on the one hand, switches 1.1 4.8 each having at least one network interface and, on the other hand, communication links 114 each connecting either one node 1 16 and one network interface of a switch 1.1 1.8, or two network interfaces of two respective switches 1.1 4.8.

The computer cluster 100 has a certain topology defining the relative arrangement of nodes 1 16, switches 1.1 4.8 and communication links 114. In the example described, the topology is that of a Parallel Generalized Fat Tree (PGFT). The topology of a PGFT is typically defined by the following nomenclature: PGFT(h; m_1 m_h; w_1 w_h; p_1 p_h), where h is the number of levels between which the switches are distributed, m_n is the number of level n−1 switches (or nodes for the first level) connected to each level n switch, w_n is the number of level n switches connected to each level n−1 switch (or to each node for the first level) and p_n is the number of parallel communication links used between levels n and n−1 (or between level n and nodes for the first level). In the example described, the topology of computer cluster 100 is PGFT (4; 2, 2, 2, 2; 1, 2, 2, 2; 1, 1, 1). Thus, in the example described, the first level switches are switches 1.1 1.8, the second level switches are switches 2.1 2.8, etc.

Each switch 1.1 4.8 has connection ports present in the network interface(s) of that switch 1.1 4.8, to which the communication links 114 are respectively connected. In the example described, the communication links 114 are all bi-directional, so that all ports are both inbound and outbound ports.

Additionally, in the example described, each switch 1.1 4.8 has local routing tables associated with its respective inbound ports. Each local routing table associates an outgoing port of the switch with each destination of an incoming message via the incoming port in question.

Additionally, each switch 1.1 4.8 has default local routing tables. In the example described, the default routing tables are, for example, pre-determined by the d-mod-k algorithm or by the s-mod-k algorithm.

For example, switch 1.3 is shown in FIG. 2 with the four communication links connecting it to its neighboring nodes 5 and 6 and its neighboring switches 2.3 and 2.4. Switch 1.3 thus has the four ports: P_5, P_6, P_2.3 and P_2.4, which are both incoming and outgoing ports. An example of a default local routing table for port P_6 of switch 1.3, obtained by the d-mod-k algorithm, is shown in Table 1 below.

TABLE 1

Default local routing table for port P_6 of switch 1.3

| Destination nodes | Exit port |
|---|---|
| 1 | P_2.3 |
| 2 | P_2.4 |
| 3 | P_2.3 |
| 4 | P_2.4 |
| 5 | P_5 |
| 6 | P_6 |
| 7 | P_2.3 |
| 8 | P_2.4 |
| 9 | P_2.3 |
| 10 | P_2.4 |
| 11 | P_2.3 |
| 12 | P_2.4 |
| 13 | P_2.3 |
| 14 | P_2.4 |
| 15 | P_2.3 |
| 16 | P_2.4 |

Back to FIG. 1, the computer cluster 100 also includes an administration server 112. In particular, the administration server 112 is designed to interact with clients that want to use computer cluster 100, which is then seen by the clients as a single machine.

The administration server 112 is designed to implement a task implementation method, as described below. To do this, the administration server 112 comprises software and/or hardware means, such as a resource manager (like the slurm software) and a routing establishment module, to perform the steps that will be described below. In the example described, the administration server 112 comprises, as is known per se, a central processing unit and a main memory wherein instructions for the central processing unit are intended to be stored. Thus, in the example described, the means are software means, in the form of a computer program downloadable from a communication network and/or recorded on a computer-readable and/or processor-executable medium, comprising instructions for performing method steps when said computer program is executed on the administration server. Alternatively, all or part of these means could be micro-programmed hardware means or micro-wired in dedicated integrated circuits. Thus, alternatively, the administration server 112 could be an electronic device composed solely of digital circuits (without a computer program) for performing the same actions.

In other embodiments of the invention, the various functions of the administration server 112 could be distributed among several devices, for example among several computers. For example, the resource manager could be implemented on one computer and the routing establishment module on another computer.

The computer cluster 100 allows the distribution of complex processing and/or parallel computing to at least some of the computing computers 102.

As explained in more detail below, to each task deployed are allocated, on the one hand, nodes and, on the other hand, switches and links between these switches, forming a sub-network of interconnection of the allocated nodes.

In the description below, the following terminology will be used.

A link is said to be unused when it is not allocated to a task. Thus, no task uses this link, so that no data related to the execution of a task goes through this link. The link is said to be used in the opposite case, i.e. when it is allocated to at least one task, so that data related to the execution of this or these tasks go through this link.

A link is said to be available when it is unused (i.e., as explained above, allocated to no task) or when it is allocated to less than N other tasks, N being a predefined number equal to at least one. The predefined number N thus represents the maximum number of task(s) that can use the same link. The number N can be equal to one, in which case the two branches of the previous alternative are equivalent. Alternatively, the number N can be two or more. For example, the number N is defined before tasks are deployed in computer cluster 100, and applies to all tasks deployed later, until the number N is redefined. This redefinition occurs, for example, when no tasks are deployed to computer cluster 100.

A switch is said to be unused when it is not allocated to any task. It is said to be in use when it is allocated to at least one task.

Referring to FIG. 3, a method 300 for deploy a task, hereafter referred to as a task in progress, in the computer cluster 100 will now be described.

Method 300 comprises a step 302 for deploying the current task in the computer cluster 100, a step 304 for executing the current task and a step 306 for flushing after execution.

The current task deployment step 302 consists of the following steps from 308 to 316. For example, step 308 is performed by the resource manager, while steps 310-316 are performed by the routing establishment module.

In step 308, the administration server 112 receives the current task and a number representing the number of nodes that the current task needs to run.

In step 310, the administration server 112 allocates nodes to the current task, connected to the minimum possible number of unused switches. For example, the administration server 112 allocates nodes connected to switches that are already in use first, and then consecutive nodes.

In a step 312, the administration server 112 determines a subnetwork of the network 110 that meets predefined determination criteria.

In particular, the determination criteria include a first criterion whereby the subnetwork interconnects the allocated nodes.

In the example described, the determination criteria further include a second criterion according to which the subnetwork uses only available links (i.e., allocated to no other tasks or allocated to fewer than N other tasks already deployed) and a third criterion according to which the determined subnetwork is the one of at least two subnetworks satisfying the other criteria, using the most switches already in use (i.e., allocated to at least one already deployed task).

In the example described, the at least two subnetworks comprise all the subnetworks meeting the other criteria.

In one embodiment, the subnets searched for are trees. Thus, the administration server 112 scans the switches, for example in ascending order of level, to find each tree (i) originating from that switch, (ii) using only available links, and (iii) serving all nodes allocated to the current task. Thus, in the example described, the administration server 112 determines all possible trees having the same minimum level to serve all the allocated nodes (indeed, trees whose peak of higher level will necessarily require more unused switches) and selects, among these possible trees, the one using the most switches already used.

Alternatively, one could use an algorithm that builds the subnetwork satisfying the three determination criteria. Thus, there would be no need to explicitly determine all the subnets satisfying the criteria other than the third one, in order to select one of them. The construction itself would ensure that the constructed subnetwork would be the one using the most switches already in use.

For example, an algorithm for constructing the subnetwork is presented in the Annex.

This algorithm uses the notion of subtopology.

A subtopology is for example a set of one or more switches, none of which is connected to a lower level switch. Thus, the complete topology is an example of a subtopology. Each top-level switch is also an example of a subtopology.

Another definition of a subtopology is given in the article by Jean-Nosl QUINTIN and Pierre VIGNERAS entitled Transitively Deadlock-Free Routing Algorithms published in 2016 in the Conference HiPINEB, HPCA and available at the following address: https://www.researchgate.net/publication/301345528_Transitively_Deadlock-Free_Routing_Algorithms This paper defines the concept of enclosing subtopology, represented by a tuple $(d_1, d_j)$, $1 < I_{max} - 1$: the set of switches of level k, $k < I_{max} - 1$ with topological addresses in the form of $(k, d_1, d_j, e_i, e_{Imax-1})$: they all share the same infix given by the subtopology notation.

In a step 314, the administration server 112 allocates the subnet determined in step 312 to the current task. The links and switches in this subnet are thus allocated to the current task. Thus, each link is dedicated to a maximum of N tasks, which reduces the impact of tasks on each other. Thus, it is possible to reduce the variance of successive execution times of the same task. Indeed, each time this task is executed, the links it will use will be shared with a limited number of other tasks. At best, when the number N is one, the links used by this task will be completely dedicated to it. Thus, the execution environment of this task varies little with each new execution, which results in a reduction in the variance of execution times.

In step 316, the administration server 112 implements, in the interconnection network 110, inter-node communication routes in the allocated subnetwork. In the example described, this implementation is achieved by modifying the local routing tables, if necessary. Specifically, in the example described where a PGFT network is used, it is only necessary to modify the uplink routing tables, i.e. to move to a higher level. Additionally, the uplink routing tables only need to be changed if nodes allocated to the task do not form a complete subtopology. Thus, the number of possible modifications to be made is very small, which does not significantly slow down the task deployment.

After deployment step 302, the current task runs in step 304.

Post-Execution Clearance Step 306 comprises the following steps 318 to 324.

In a step 318, the administration server 112 undoes the changes made in step 316 in the local routing tables. This return to the default routing tables ensures that deploying a new task will require few changes to the default routing tables, as explained hereinbefore about step 316.

In step 320, the administration server 112 releases (i.e., deallocates) the nodes and subnet allocated to the current task.

In step 322, the administration server 112 searches for unused links in the computer cluster 100 (i.e., links that are not allocated to any task). Preferably, the search is performed only among the links released in step 320.

In a step 324, the administration server sets each found link in an inactive state wherein the link requires less power consumption than a power consumption required by an active link associated with at least one task (and thus used by that task or those tasks).

For example, in one embodiment, the administration server 112 shuts down both network interfaces that this link connects so that no power or light is flowing through this link. In another embodiment, the administration server 112 decreases an operating frequency of the two network interfaces that this link connects.

Referring to FIGS. 4 to 12, a non-limiting example of the implementation of procedure 300 will now be described.

It is assumed that the computer cluster 100 is configured so that the predefined number N is one. Thus, each link in the computer cluster 100 can only be allocated to a maximum of one task. Additionally, it is assumed that initially no tasks are deployed to the computer cluster 100. Thus, all links are available. As a result, the default local routing tables are used and the links are set in the inactive state in order to reduce the power consumption of the computer cluster 100.

Referring to FIG. 4, the administration server 112 implements step 308 and receives a task t1 requiring n1 nodes of the computer cluster 100. In the example described, n1 is five.

The administration server 112 performs step 310 and allocates the following n1 nodes to task t1: 1, 2, 3, 4, 5.

The administration server 112 implements step 312 and determines a subnetwork for interconnecting the allocated nodes. In the example described, the administration server 112 traverses the switches in ascending order of level and, in the example described, by ascending number on the same level (from left to right in FIG. 4). For example, the administration server 112 browses through the first tier switches and then through the second tier switches. However, for switches 1.1 to 1.8 and 2.1 to 2.8, there is no tree connecting all allocated nodes 1, 2, 3, 4, 5. Thus, the administration server 112 arrives at switch 3.1, from where tree A1 depicted in bold in FIG. 4 starts. Tree A1 uses only available links and interconnects all allocated nodes 1, 2, 3, 4, 5.

There is also another tree, from switch 3.3, which interconnects all allocated nodes and uses only available links. These two trees have the same number of unused switches (six), so that the administration server can retain any one of them. For example, the administration server 112 retains tree A1.

The administration server 112 implements step 314 and then allocates tree A1 to task t1.

The administration server 112 implements step 316 and implements communication routes between the allocated nodes in tree A1. To do this, in the example described, the administration server 112 modifies the local routing tables if necessary.

At this point, task t1 is deployed and is executed (step 304) by the computer cluster 100 on the allocated nodes that communicate therebetween following the routes in tree A1.

Referring to FIG. 5, the administration server 112 implements step 308 and then receives task t2 requiring n2 nodes of the computer cluster 100. In the example described, n2 is five.

The administration server 112 implements step 310 and allocates nodes to task t2 by prioritizing the nodes connected to the switches already in use, i.e., node 6. Thus, in the example disclosed, the administration server 112 allocates the following n2 nodes to task t2: 6, 7, 8, 9, 10.

The administration server 112 implements step 312 and determines a subnetwork for interconnecting the allocated nodes. As previously mentioned, the administration server 112 traverses the switches in ascending order. The first switch from which a tree serving the allocated nodes 6, 7, 8, 9, 10 starts is switch 4.1. However, this tree contains the link between switches 2.3 and 3.1, which is already allocated to task t1 and thus unavailable. Thus, the administration server 112 does not retain this tree and goes to switch 4.2, from which tree A2 starts. This tree uses only available links and serves all allocated nodes 6, 7, 8. Similarly, the administration server 112 determines the trees from switches 4.4, 4.6, and 4.8 shown in FIGS. 6, 7, and 8, respectively. These four trees contain the same number of unused switches. Thus, the administration server 112 can select any one of them, for example tree A2 from switch 4.2 (FIG. 9).

The administration server 112 implements step 314 and allocates tree A2 to task t2.

The administration Server 112 implements step 316 and implements communication routes between the allocated nodes in tree A2.

To do this, in the example described, the administration server 112 modifies the local routing tables if necessary. For example, the local routing table for port P_6 in switch 1.3 is modified as shown in Table 2 below (modification shown in bold and italics).

TABLE 2

Modified local routing table for port P_6 in switch 1.3

| Destination nodes | Exit port |
| --- | --- |
| 1 | P_2.3 |
| 2 | P_2.4 |
| 3 | P_2.3 |
| 4 | P_2.4 |
| 5 | P_5 |
| 6 | P_6 |
| 7 | *P_2.4* |

TABLE 2-continued

Modified local routing table for port P_6 in switch 1.3

| Destination nodes | Exit port |
| --- | --- |
| 8 | P_2.4 |
| 9 | P_2.3 |
| 10 | P_2.4 |
| 11 | P_2.3 |
| 12 | P_2.4 |
| 13 | P_2.3 |
| 14 | P_2.4 |
| 15 | P_2.3 |
| 16 | P_2.4 |

Thus, messages from node 6 to nodes 7 to 10 all go through the link connecting switches 1.3 and 2.4 and thus avoid the link connecting switches 1.3 and 2.3 allocated to task t1, which would not have been the case if the default routing table had been kept.

At this stage, tasks t1 and t2 are deployed and executed (step 304) by the computer cluster 100, on the respectively allocated nodes which communicate therebetween by following the routes of trees A1 and A2, respectively.

Referring to FIG. 10, the administration server 112 implements step 308 and then receives a task t3 requiring n3 nodes of the computer cluster 100. In the example described, n3 is three.

The administration server 112 implements step 310 and allocates nodes to task t3 by first allocating nodes connected to the switches already in use (none at this point), and then allocating consecutive nodes. Thus, in the example disclosed, the administration server 112 allocates the following n3 nodes to task t3: 11, 12, 13.

The administration server 112 implements step 312 and determines a subnetwork for interconnecting the allocated nodes. The administration server 112 therefore finds the three trees from switches 3.5, 3.7, 3.8, respectively shown in FIGS. 10, 11 and 12, satisfying the first and second determination criteria. Of these three trees, the tree from switch 3.8 (subsequently called A3) has four unused switches (numbered in bold in FIG. 12), while the other two trees each require five unused switches (numbered in bold in FIGS. 10 and 11). Thus, the tree from switch 3.8 (tree A3) satisfies the third determination criterion and is thus retained by the administration server 112.

The administration server 112 implements step 314 and allocates tree A3 to the t3.

The administration server 112 implements step 316 and implements, in tree A3, communication routes between the allocated nodes, modifying, if necessary, the local routing tables.

At this stage, tasks t1, t2 and t3 are deployed and executed (step 304) by the computer cluster 100, on the respectively allocated nodes that communicate therebetween by following the routes of the trees A1, A2 and A3, respectively (FIG. 13).

Referring to FIG. 14, at a later time, task t2 completes its execution.

Thus, the administration server 112 implements step 318 and cancels the modifications made in the local routing tables to deploy task t2.

The administration server 112 implements step 320 and releases (i.e., deallocates) the nodes and the subnet A2 allocated to task t2. Released links are shown in dashed line and bolded.

The administration server 112 implements step 322 and looks for links in computer cluster 100 that are not allocated to any task. Preferably, the search is performed only among the links of task t2. In the example described, since a link can be allocated to no more than one task (N equals one), all links that were allocated to task t2 become unused.

The administration server 112 implements step 324 and sets each link found (i.e. in the example disclosed all links that were allocated to task t2, shown in dashed line and bolded) in the inactive state.

Thus, it is possible to reduce energy consumption by disabling unused links, especially those connecting switches to computing nodes. Generally, on a PGFT, half of the links are dedicated to computing nodes and the other half to inter-switch links. If, for example, ten nodes connected to the same switch are used for a particular task, these ten nodes will communicate externally only to the input/output nodes (for example, the nodes of the storage computers 104). Thus, it is possible to shut down up to ten links during the execution of this task (depending on the number of input/output nodes in the supercomputer as well as the input/output node requirements requested by the user, it is possible to keep these links active).

It is clear that a method such as the one disclosed above makes it possible to reduce the power consumption of the supercomputer.

It should also be noted that the invention is not limited to the modes of implementation described above. It will indeed become evident to the skilled person that various modifications can be made to the embodiment described above, in light of the findings that have just been disclosed to him/her. In the detailed presentation of the invention that is made above, the terms used shall not be interpreted as limiting the invention to the embodiment set out in this description, but shall be interpreted to include all the equivalents whose prediction is within the grasp of the person skilled in the art by applying his/her general knowledge to the implementation of the findings that have just been disclosed to him/her.

APPENDIX

Count the number of nodes allocated per subtopology.
For each subtopology with a non-zero number of allocated nodes:
(switches with respectively increasing numbers s starting from 0) for s=0; s<S_n; s++:
  check if there is a link tree allowing access to all the nodes allocated in the subtopology,
  if yes, increment the number of accessible top switches of these switches,
  if no, move on to the next one.
Take one of the most important subtopologies (called T_n_c of level n: the highest level switches are of level n).
Consider that there are S_n switches of level n.
For each subtopology included in T_n_c of level n−1, we have a number of allocated nodes x_n−1 (For simplicity, it is considered that each subtopology has the same number of allocated nodes. This particular case is easily generalizable in case two subtopologies have different numbers of allocated nodes).
As long as nb_switch_allocated_level_n at level n is less than x_n−1:
  take an unvisited l1 switch:
    there are X level l1 switches in the smallest encompassing subtopology,
    select a higher level switch with a T value counter as close as possible (nb_switch_allocated−x_n−1)
    allocate all downlinks from this switch to the X switches having allocated nodes (including the selected one)
    select in the twin sub-topologies (twin as in the article by QUENTIN and VIGNERAS) the same switch (it is necessarily allocatable due to the way the counter is calculated),
    repeat at most X times the same by considering a switch l2 which has just been allocated as long as nb_switch_allocated_level_n is less than x_n−1,
    at each top switch allocation, increase nb_switch_allocate_level_n,
    then to the next levels,
    once all levels are done, decrement the counters of the allocated switches by X.
Note: In case of unbalanced allocation, reallocation is possible for some subtopologies (in order to have the necessary bandwidth for the nodes).

What is claimed is:

1. A method for deploying a task in a computer cluster forming a supercomputer, the supercomputer comprising
  computers, wherein each computer of said computers comprises at least one network interface forming a node; and
  a network for interconnecting all of said node from each computer of said computers, comprising
    switches, each switch of said switches comprising network interfaces, wherein the switches are arranged in a Parallel Generalized Fat Tree (PGFT) topology having at least four levels between which the switches are distributed, and
    links, each link of said links connecting either
      said node and said network interfaces of one switch or said switches, or
      two network interfaces of two switches respectively;
  the method comprising:
    deploying the task in the supercomputer, the deploying comprising:
      allocating nodes to the task;
      scanning the switches in ascending order of level, to find all possible subnetworks, having a same minimum level, interconnecting the nodes that are allocated to said task;
      selecting from among the possible subnetworks, a first subnetwork using the most switches already used;
      allocating the first subnetwork and the links belonging to said first subnetwork, to the task, each link of the first subnetwork being dedicated to the task; and
      implementing inter-node communication routes in the first subnetwork that is allocated;
  the method further comprising:
    executing the task; and
    at an end of the executing of the task:
      releasing the links belonging to the first subnetwork allocated to the task that ended;
      detecting, among the links that are released, at least one link that is not allocated to any task; and
      setting each link of said at least one link that is detected in an idle state, wherein the each link that is in the idle state requires less energy consumption than a link associated with at least one task.

2. The method according to claim 1, further comprising, for setting said each link in the idle state, switching off the two network interfaces that the link connects such that no current or light flows through the each link.

3. The method according to claim 1, further comprising, in order to set said each link in the idle state, reducing an operating frequency of at least one of the two network interfaces that said each link connects.

4. The method according to claim 1, wherein the first subnetwork uses only links which are not allocated to any other already deployed task or which are allocated to fewer than N other tasks already deployed, N being a predefined number equal to one or more.

5. The method according to claim 4, wherein N is one.

6. A non-transitory computer readable medium comprising a program including instructions for executing steps of a method for deploying a task in a computer cluster forming a supercomputer, when said program is executed on one or more computers, wherein said supercomputer comprises
said one or more computers, each computer of said one or more computers comprising at least one network interface forming a node;
a network for interconnecting all of said node from said each computer of said one or more computers, comprising
switches, each switch of said switches comprising network interfaces, wherein the switches are arranged in a Parallel Generalized Fat Tree (PGFT) topology having at least four levels between which the switches are distributed, and
links, each link of said links connecting either
said node and said network interfaces of one switch or said switches, or
two network interfaces of two switches respectively;
the method comprising:
deploying the task in the supercomputer, the deploying comprising:
allocating nodes to the task;
scanning the switches in ascending order of level, to find all possible subnetworks, having the same minimum level, interconnecting the nodes that are allocated to said task;
selecting from among the possible subnetworks, a first subnetwork using the most switches already used;
allocating the first subnetwork and the links belonging to said first subnetwork, to the task, each link of the first subnetwork being dedicated to the task; and
implementing inter-node communication routes in the first subnetwork that is allocated;
the method further comprising:
executing the task; and
at an end of the executing of the task:
releasing the links belonging to the first subnetwork allocated to the task that ended;
detecting, among the links that are released, at least one link that is not allocated to any task; and
setting each link of said at least one link that 1s detected in an idle state, wherein the each link that is in the idle state requires less energy consumption than a link associated with at least one task.

7. A computer cluster forming a supercomputer comprising:
computers, each computer of said computers comprising at least one network interface forming a node;
a network for interconnecting all of said node from said each computer of said computers, said network comprising:
switches, each switch of said switches comprising a network interface, wherein the switches are arranged in a Parallel Generalized Fat Tree (PGFT) topology having at least four levels between which the switches are distributed, and
links, each link of said links connecting either
said node and said network interfaces of one switch of said switches, or
two network interfaces of two respective switches of said switches;
the supercomputer further comprising one or more of software and hardware components for deploying a task, configured to implement steps of:
deploying the task in the supercomputer, the deploying comprising:
allocating nodes to the task;
scanning the switches in ascending order of level, to find all possible subnetworks, having the same minimum level, interconnecting the nodes that are allocated to said task;
selecting from among the possible subnetworks, a first subnetwork using the most switches already used;
allocating the first subnetwork and the links belonging to said first subnetwork, to the task, each link of the first subnetwork being dedicated to the task; and
implementing inter-node communication routes in the first subnetwork that is allocated;
executing the task; and
at an end of said executing of the task:
releasing the links belonging to the first subnetwork allocated to the task that ended;
detecting, among the links that are released, at least one link that is not allocated to any task, and
setting each link of said at least one link that is detected in an idle state, wherein the each link that is in the idle state requires less energy consumption than a link associated with at least one task.

* * * * *